United States Patent
Baratakke et al.

(10) Patent No.: US 9,426,022 B2
(45) Date of Patent: Aug. 23, 2016

(54) SEA FAILOVER MECHANISM WITH MINIMIZED PACKET LOSSES

(71) Applicant: International Business Machines Corporation, Armonk, NY (US)

(72) Inventors: Kavitha Vittal Murthy Baratakke, Round Rock, TX (US); Shaival Jagdishbhai Chokshi, Round Rock, TX (US); Vishal Ramachandra Mansur, Hubli (IN); Xiaohan Qin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/105,398

(22) Filed: Dec. 13, 2013

(65) Prior Publication Data

US 2014/0140201 A1    May 22, 2014

Related U.S. Application Data

(63) Continuation of application No. 13/359,745, filed on Jan. 27, 2012, now abandoned.

(51) Int. Cl.
    *H04L 12/26*    (2006.01)
    *H04L 12/24*    (2006.01)
    *G06F 11/20*    (2006.01)

(52) U.S. Cl.
    CPC ........ *H04L 41/0668* (2013.01); *G06F 11/2005* (2013.01); *H04L 43/10* (2013.01)

(58) Field of Classification Search
    None
    See application file for complete search history.

(56) References Cited

U.S. PATENT DOCUMENTS

| | | | |
|---|---|---|---|
| 6,507,869 B1* | 1/2003 | Franke et al. | 709/224 |
| 6,718,383 B1* | 4/2004 | Hebert | 709/224 |
| 7,275,175 B2 | 9/2007 | Cardona et al. | |
| 7,577,089 B2 | 8/2009 | Varada et al. | |
| 7,606,141 B2 | 10/2009 | Schimke et al. | |
| 7,739,543 B1 | 6/2010 | Pittman et al. | |
| 7,913,106 B2 | 3/2011 | Jain et al. | |
| 2006/0250945 A1* | 11/2006 | Fernandes et al. | 370/216 |
| 2007/0159960 A1 | 7/2007 | Schimke et al. | |
| 2010/0097941 A1 | 4/2010 | Carlson et al. | |
| 2013/0194912 A1 | 8/2013 | Baratakke et al. | |

OTHER PUBLICATIONS

IBM; "POWER6 Information; Shared Ethernet Adapter failover"; downloaded from http://publib.boulder.ibm.com/infocenter/powersys/v3r1m5/index.jsp?topic=/iphb1/iphb1_vios_sea_failover.htm; downloaded Apr. 25, 2011.

* cited by examiner

*Primary Examiner* — Willie J Daniel, Jr.
(74) *Attorney, Agent, or Firm* — Thomas E. Tyson; Gregory K. Goshorn; Greg Goshorn, P.C.

(57) ABSTRACT

Provided are techniques for active SEA learning about a client LPAR MAC addresses via address resolution protocol (ARP) packets received on a virtual interface (of the active SEA). Any new client MAC addresses learned on the active SEA are sent to the inactive SEA via a control channel. When SEA failover happens, as the previously inactive SEA is about to become active, it will first send out RARP (reverse ARP) packets with the client MAC addresses as the source MAC addresses respectively. This effectively informs the switch connected to the previously inactive SEA that these client MAC addresses are to be routed through this switch port; the client MAC addresses saved on the switch connected to the previously active SEA are cleared as a result.

20 Claims, 5 Drawing Sheets

SEA FAILOVER MECHANISM WITH MINIMIZED PACKET LOSSES

CROSS-REFERENCES TO RELATED APPLICATIONS

The present application is a continuation and claims the benefit of the filing date of an application entitled, "Improving SEA Failover Mechanism with Minimized Packet Losses" Ser. No. 13/359,745, filed Jan. 27, 2012, assigned to the assignee of the present application, and herein incorporated by reference.

FIELD OF DISCLOSURE

The claimed subject matter relates generally to computing and, more specifically, to techniques for the minimization of lost packets in electronic communication.

SUMMARY

Provided are techniques for the minimization of packet loss during failover in a computing environment that includes Shared Ethernet Adapters (SEAs). In a current Virtual I/O server (VIOS) environment, network redundancy is achieved by means of a SEA fail-over configuration. A SEA fail-over configuration consists of a primary SEA and a backup SEA, each residing in a separate VIOS. The SEA's communicate via a control channel through a hypervisor (HYPR). Fail-over protocol is employed to determine which SEA is the primary SEA, i.e., actively bridging traffic for virtual I/O (VIO) clients. When the primary SEA is active, the backup SEA is dormant. If a fail-over occurs, the backup SEA then actively bridges traffic for VIO clients. When a failover from the primary to the backup occurs, a SEA driver relies upon link reset to notify switches connected to a physical adapter of a route change for clients' logical partitions (LPARs) Media Access Control (MAC) addresses.

Also provided are techniques for active SEA learning about the client LPAR MAC addresses via address resolution protocol (ARP) packets received on the virtual interface (of the active SEA). Any new client MAC addresses learned on the active SEA are sent to the inactive SEA via a control channel. When SEA failover happens, as the previously inactive SEA is about to become active, it first sends out RARP (reverse ARP) packets with the client MAC addresses as the source MAC addresses. This technique effectively informs the switch connected to the previously inactive SEA that these client MAC addresses are to be routed through this switch port. Client MAC addresses saved on the switch connected to the previously active SEA are cleared as a result.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
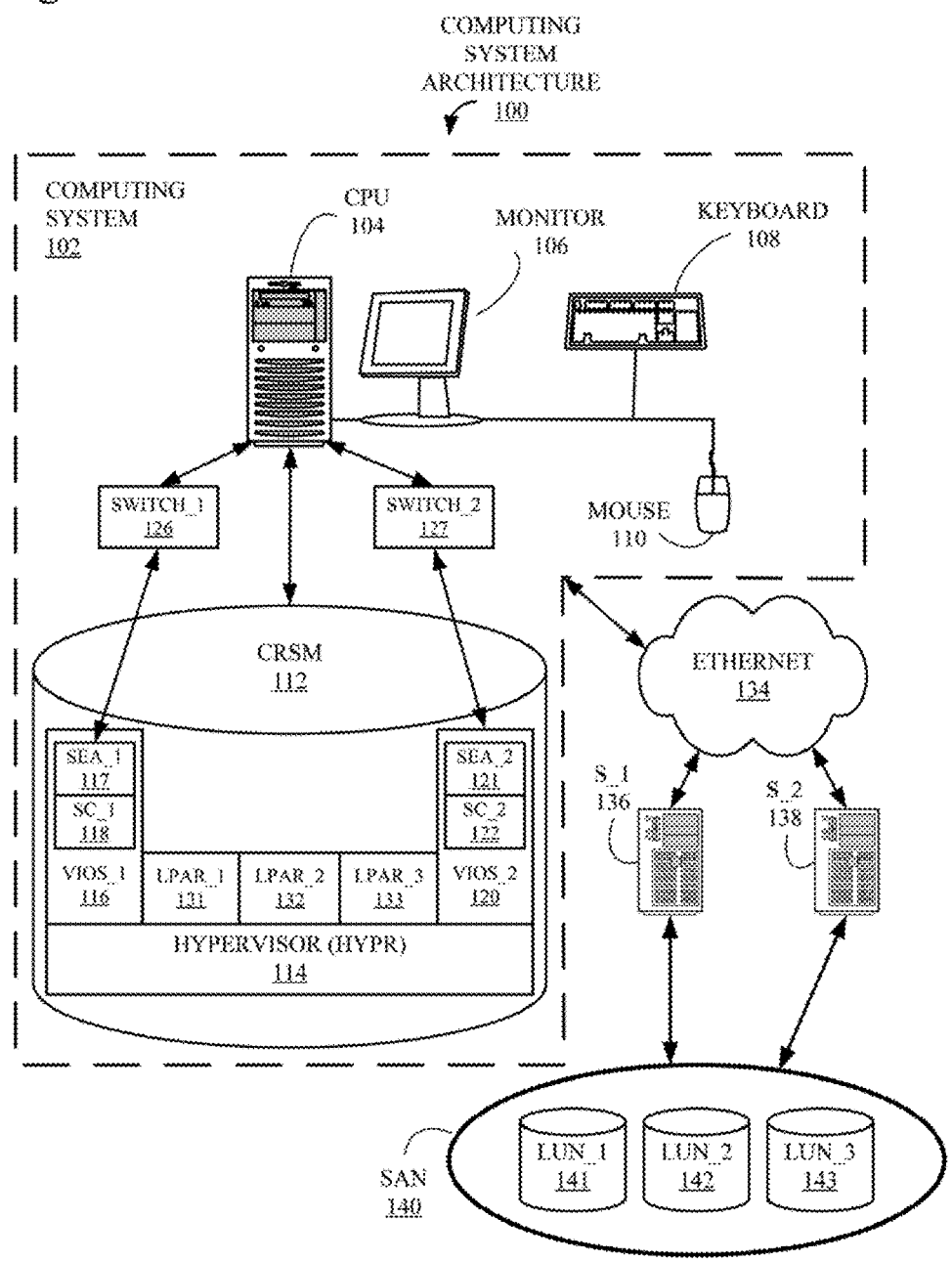
FIG. 1 is a block diagram of on computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As explained above, when a failover from a primary Shared Ethernet Adapter (SEA) to a backup SEA occurs, a SEA driver typically relies upon link reset to notify switches connected to a physical adapter of a route change. Drawbacks of relying on adapter link reset to notify the switch of client LPAR MAC routing change include, but are not limited to: 1) If the VIOS hosting the original primary SEA hangs or crashes, the primary SEA may not be able to issue a link reset; and 2) In some advanced adapters with built-in virtualization capability, e.g., IVE, adapter link reset is not supported. In addition, any delay for the switch to learn about the client LPAR MAC routing change may lead to packet losses. If a switch is not is not aware that a failover has occurred and continues to deliver packets to a dead or inactive SEA, significant packet loss and an interruption of communication may occur.

One potential work-around for this scenario is for each logical partition (LAPR) or virtual machine (VM) to generate traffic on the corresponding network when a failover is detected. However, LPARs must then monitor the status of the Virtual I/O Server (VIOS) by continuously pinging the VIOS and then react when the VIOS becomes unavailable. This approach generates additional traffic on the network and is neither scalable nor practical because it must be deployed on all LPARs and doesn't handle some scenarios such as when the SEA is in a standby mode.

Turning now to the figures, FIG. 1 is a block diagram of a computing system architecture 100 that may implement the claimed subject matter. A computing system 102 includes a central processing unit (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) 112, which may either dynamic or non-dynamic memory and incorporated into computing system 102 i.e. an internal device, or attached externally to CPU 104 by means of various, commonly available connection devices such as but not limited to, a universal serial bus (USB) port (not shown).

CRSM 112 is illustrated storing a hypervisor (HYPR) 114 and a number of logical partitions, or LPARs, i.e. a LPAR_1 131, a LPAR_2 132 and a LPAR_3 133. As should be familiar to one with skill in the relevant arts, each of LPAR 131-133 may implement a different operating system (OS) such that multiple OSs (not shown) are able to run concurrently on computing system 102. Also stored on CRSM 112 are two (2) virtual Input/Output servers, i.e. a VIOS_1 116 and a VIOS_2 120, which handle communication tasks associated with LPARs 131-133. VIOS_1 116 and VIOS_2 120 include a Shared Ethernet Adapter (SEA), i.e. a SEA_1 117 and a SEA_2 121, which are each coupled to switch, i.e. a switch_1 126 and a switch_2 127. Coupled to each of SEA_1 117 and SEA_2 121 are also a SEA controller, i.e. SC_1 118 and SC_2 122, respectively. SC_1 118 and SC_2 122 manage failovers in accordance with the claimed subject matter. The implementation and coordination of switches 126 and 127, LPARs 131-133, the respective OSs, VIOSs 116 and 120, SEAs 117 and 121 and SCs 118 and 122 are handled by HYPR 114, as explained in more detail below in conjunction with FIGS. 2-5.

Computing system 102 is connected to an Ethernet 134 via switches 126 and 127. Switches 126 and 127 and Ethernet 134 provide a connection between computing system 102 and several server computers, i.e. a S_1 136 and a S_2 138. Servers 136 and 138 may be any one of a number of different types of servers including, but not limited to, an email server, a database server and a storage server. Although in this example, computing system 102 and servers 136 and 138 are communicatively coupled via Ethernet 134, they could also be coupled through any number of communication mediums such as, but not limited to, the Internet, a local area network (LAN) and a wide area network (WAN). Servers 136 and 138 are connected to a storage area network (SAN) 140 that includes several storage devices, or logical units, specifically a LUN_1 141, a LUN_2 142 and a LUN_3 143. It should be noted there are many possible computing system configurations, of which computing system architecture 100 is only one simple example.

Figure 2:
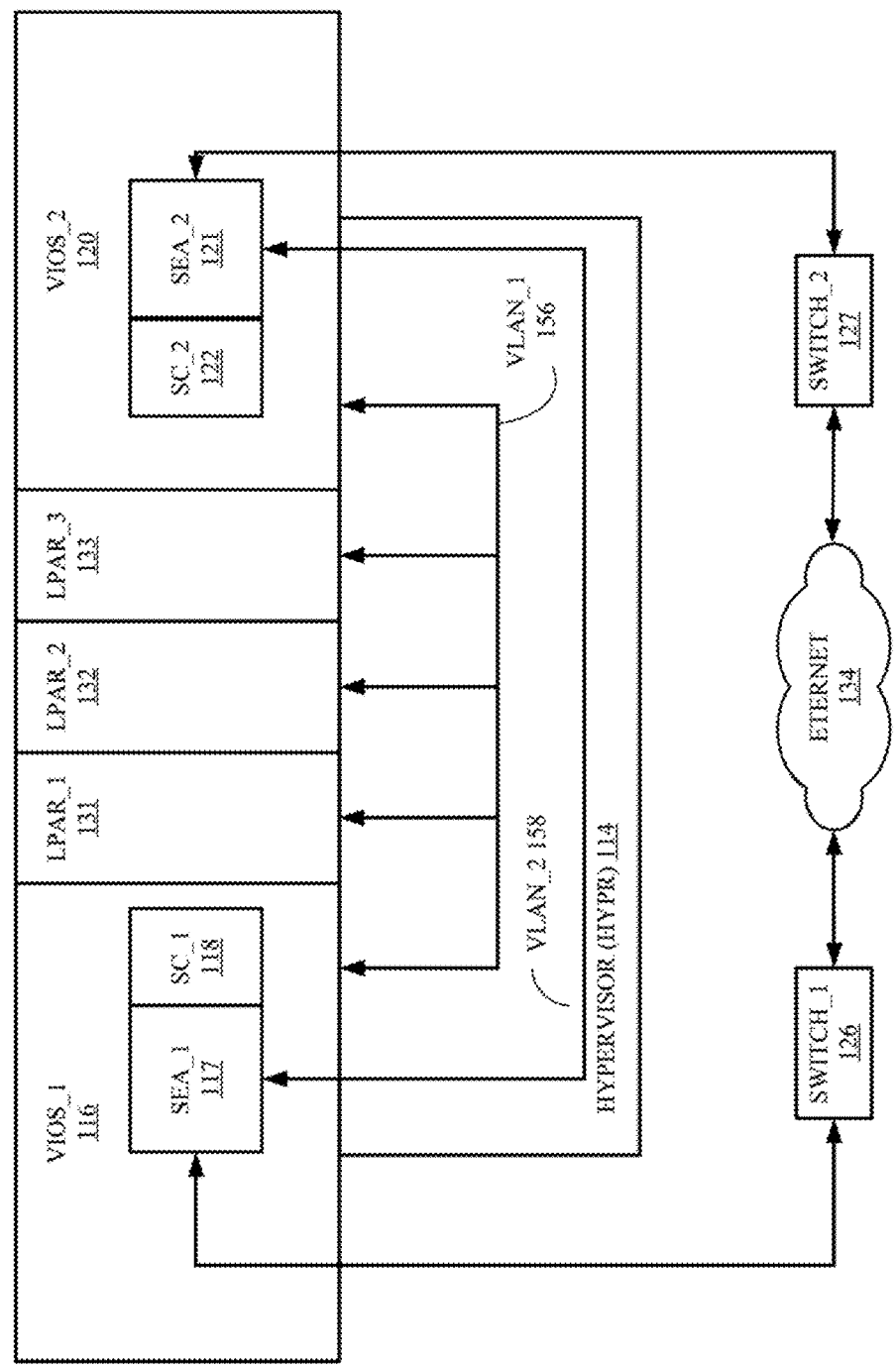
FIG. 2 is a block diagram of aspects of the computing system architecture of FIG. 1 in more detail, including a primary Shared Ethernet Adapter (SEA) and a backup SEA.

FIG. 2 is a block diagram of aspects of the computing system architecture of FIG. 1 in more detail. A topology 150 includes HYPR 114, VIOSs 116 and 120. SEAs 117 and 121, SCs 118 and 122, LPARs 131-133, switches 126 and 127 and Ethernet 134, all of which were first introduced above in conjunction with FIG. 1. LPARs 131-133 and VIOSs 116 and 120 are communicatively coupled a virtual Ethernet, i.e. a VLAN_1 156. In addition, SEAs 117 and 121 are each coupled to a control channel, i.e. a VLAN_2 158, which provides communication between SEAs 117 and 121 via HYPR 114. It should be noted that although only two (2) SEAs and (2) VLANs are illustrated and that the disclosed technology is equally applicable to systems with a greater number of such components. In the following examples, SEA_1 117 is described as the primary SEA and SEA_2 121 is described as the backup SEA. The functions of the various components illustrated in FIG. 2 are explained in more detail in conjunction with FIGS. 3-5.

Figure 3:
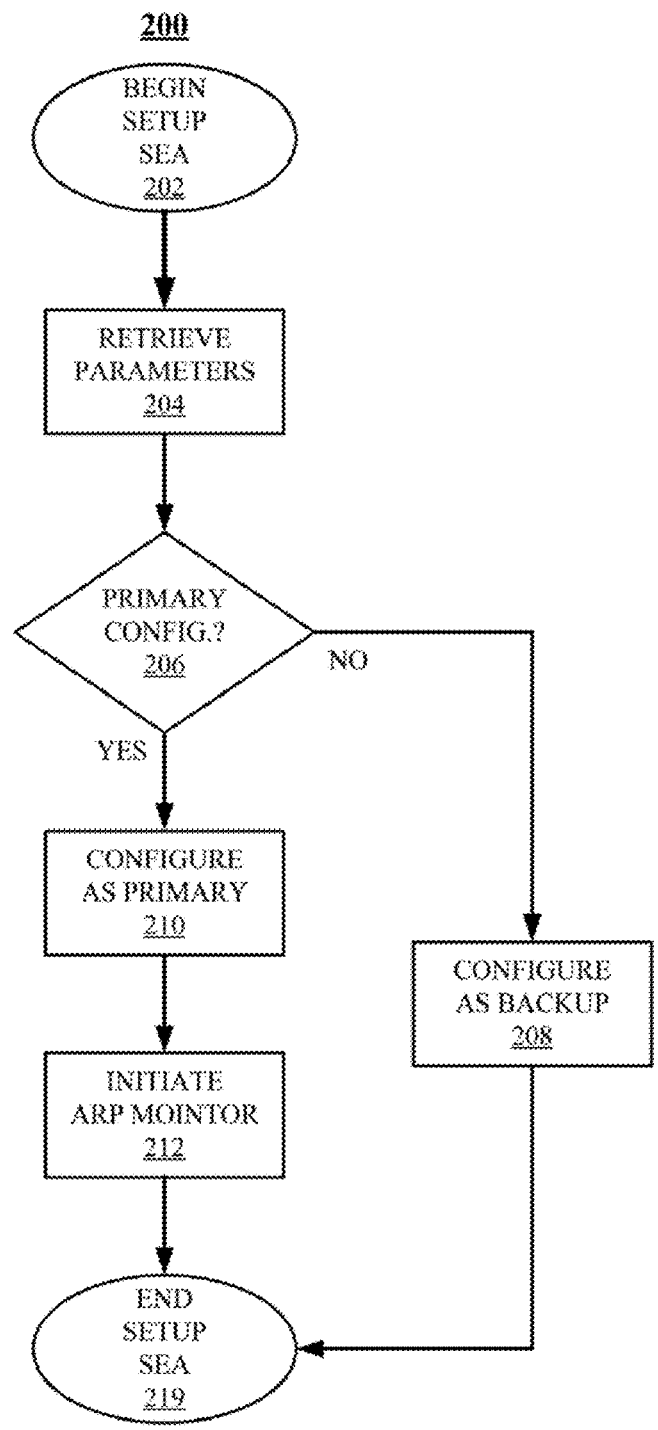
FIG. 3 is a flowchart of one example of a Setup SEA process in accordance with the claimed subject matter.

FIG. 3 is a flowchart of one example of a Setup SEA process 200 in accordance with the claimed subject matter. In this example, logic associated with process 200 is stored on CRSM 112 (FIG. 1) and executed on one or more processors (not shown) of CPU 104 (FIG. 1) of computing system 102 (FIG. 1). In addition, process 200 is associated with SC_1 118 (FIGS. 1 and 2) and SC_2 122 (FIGS. 1 and 2) of SEA_1 117 and SEA_2 121, respectively, and VIOS_1 116 (FIGS. 1 and 2) and VIOS_2 120 (FIGS. 1 and 2), respectively.

Process 200 starts in a "Begin Configuration (Config.) Shared Ethernet Adapter (SEA)" block 202 and proceeds immediately to a "Retrieve Parameters" block 204. During processing associated with block 204, parameters associated with system architecture 100, computing system 102, HYPR 114, VIOSs 116 and 120 and LPARs 131-133 (FIGS. 1 and 2) are retrieved from CRSM 112. In addition, configuration parameters associated with SCs 118 and 122 are retrieved. Such configuration parameters include, but are not limited to, such configuration options such as timeout values (see 276, FIG. 5), wait periods (see 278, FIG. 5) and indications of whether each of VIOS 116 and 120 should be originally be configured as a primary or backup.

During processing associated with a "Primary Config.?" block 206, a determination is made, based upon configuration parameters retrieved during processing associated with block 204, whether or not the corresponding VIOS 116 or 118 is to be configured as a primary. As mentioned above in conjunction with FIG. 2, in the following example, VIOS_1 116 is configured as the primary VIOS and VIOS_2 120 as the backup. If a determination is made that the corresponding VIOS 116 or 120 is designated as a backup, control proceeds to a "Configure as Backup" block 208. During processing associated with block 208, the corresponding VIOS 116 or 120, which in this example is VIOS_2 120, is configured as a backup. One aspect of the configuration of a backup is the initiation of a process to detect when a failover from the primary VIOS to the backup VIOS is necessary (see 270, FIG. 5).

If, during processing associated with block 206, a determination is made that the corresponding VIOS 116 or 120 is designated as the primary, control proceeds to a "Configure as Primary" block 210. In addition to the typical functions associated with the configuration of a primary VIOS, the primary, which in this example is VIOS_1 116, a process to implement aspects of the claimed subject matter is initiated during processing associated with an "Initiate Address Resolution Protocol (ARP) Monitor" block 212 (see 240, FIG. 4).

Finally, once the corresponding VIOS 116 or 120 has been configured as a primary or a backup, control proceeds to an "End Setup SEA" block 219 during which process 200 is complete.

Figure 4:
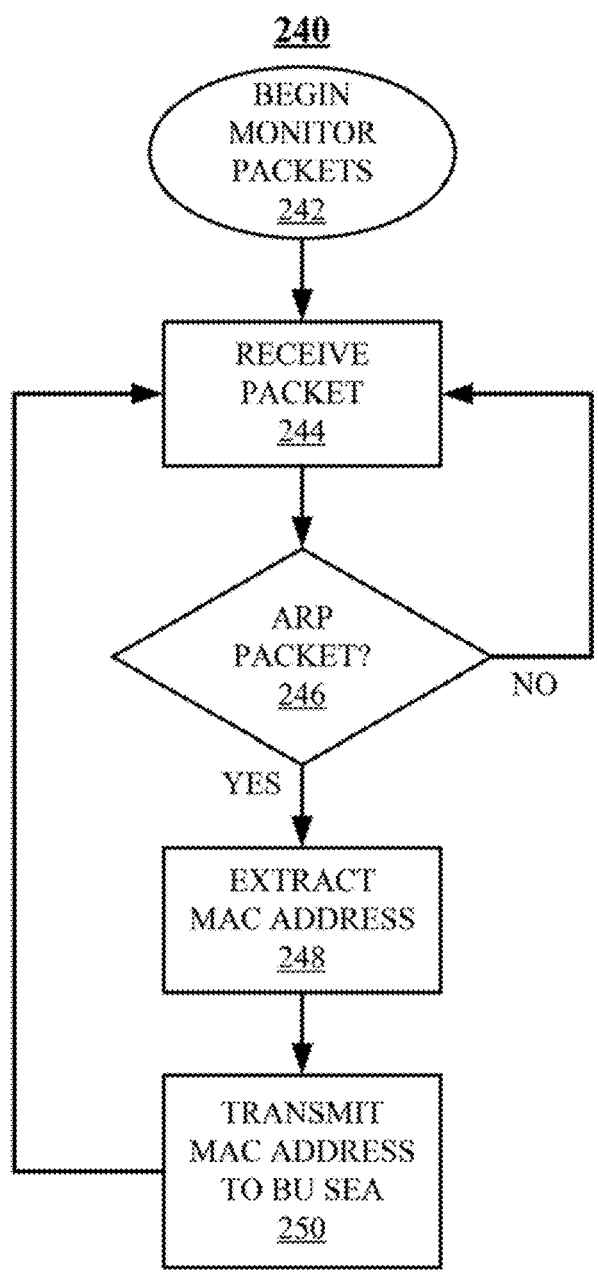
FIG. 4 is a flowchart of one example of a Monitor Packets process in accordance with the claimed subject matter.

FIG. 4 is a flowchart of one example of a Monitor Packets process 240 in accordance with the claimed subject matter. Like process 200, in this example, logic associated with process 240 is stored on CRSM 112 (FIG. 1) and executed on one or more processors (not shown) of CPU 104 (FIG. 1) of computing system 102 (FIG. 1). In addition, process 240 is associated with SEA_1 117 (FIGS. 1 and 2) and SC_1 118 (FIGS. 1 and 2) of VIOS_1 116 (FIGS. 1 and 2). In the event of a failover from the primary to backup, any new primary would also implement process 240.

Process 240 starts in a "Begin Monitor Packets" block 242 and proceeds immediately to a "Receive Packet" block 244. During processing associated with block 244, the appropriately configured SEA, which in this example is SEA_1 117, examines each packet processed by the corresponding VIOS, which in the example is VIOS_1 116. During processing associated with an "Address Resolution Protocol (ARP) Packet?" block 246, a determination is made as to whether or not the packet received during processing associated with block 244 is an ARP packet. If not, control returns to Receive Packet block 244 to await the next received packet and processing continues as described above.

If during processing associated with block 246, a determination is made that the received packet is an ARP packet, control proceeds to an "Extract Media Access Control (MAC) Address" block 248. During processing associated with block 248, the MAC address associated with the packet received during processing associated with block 244 is extracted from the packet. During processing associated with a "Transmit MAC Address to Backup (BU) SEA" block 250, the MAC address extracted during processing associated with block 248 is transmitted to the backup SEA, which in this example is SEA_2 121. SEA_2 121 stored the transmitted address for during a failover use (see 284, FIG. 5) in accordance with the claimed subject matter.

During normal operation, SEA_1 116 loops continuously through blocks 244, 246, 248 and 250 processing packets as they are received by VIOS_1 116 unless, of course, computing system 102 halts or an operating system crashes. In such a case, process 240 would also stop executing.

Figure 5:
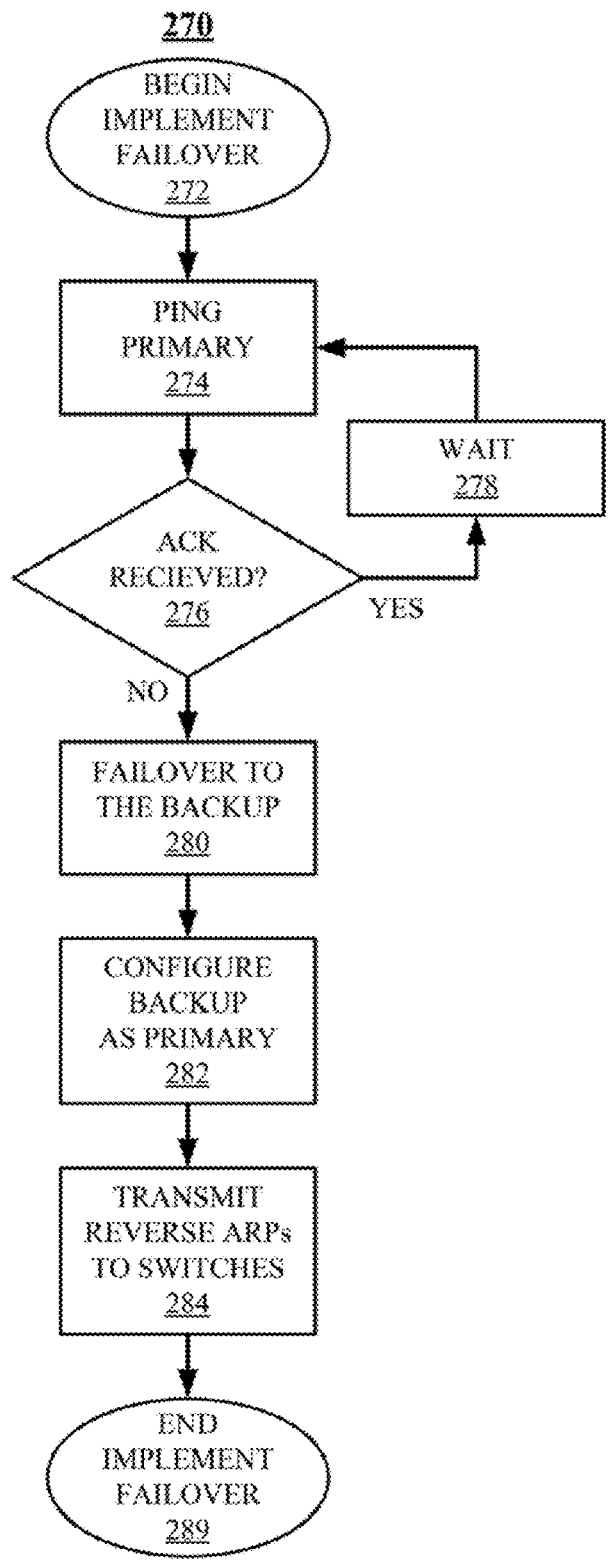
FIG. 5 is a flowchart of one example of an Implement Failover process in accordance with the claimed subject matter.

FIG. 5 is a flowchart of one example of an Implement Failover process 270 in accordance with the claimed subject matter. Like processes 200 and 240, in this example, logic associated with process 270 is stored on CRSM 112 (FIG. 1) and executed on one or more processors (not shown) of CPU 104 (FIG. 1) of computing system 102 (FIG. 1). In addition, in this example, process 270 is associated with SEA_2 121 (FIGS. 1 and 2) and SC_2 122 (FIGS. 1 and 2) of VIOS_2 118 (FIGS. 1 and 2).

Process 270 starts in a "Begin Detect Failover" block 272 and proceeds immediately to a "Ping Primary" block 274. During processing associated with block 274, SEA_2 121 transmits a short message, or "ping," to the primary SEA_1 117 requesting an acknowledgment. During processing associated with an "Acknowledgement (Ack.) Received" block 276, a determination is made as to whether or not an acknowledgement has been received. Typically, such a determination is made upon expiration of a timer (not shown) set when the primary is pinged during processing associated with block 274 and based upon administrator-defined configuration parameters. If an acknowledgement message is received, control proceeds to a "Wait" block 278. During processing associated with block 278, process 270 is paused for a predefined period of time. Control then returns to Ping Primary block 274 and processing continues as described above. It should be noted that blocks 274, 276 and 278 are merely one example of a technique for detecting a failover, i.e. detection of the lack of a "heartbeak." In a typical system, there are many different conditions that may trip a failover form a primary SEA to a backup SEA. In each of these different conditions, process 270 would be executed from a block 280 as described below.

If during processing associated with block 276, a determination is made that an acknowledgement message has not been received, for example upon expiration of a timer, control proceeds to a "Failover to the Backup" block 280. Those with skill in the appropriate arts will understand the typical steps, including, but not limited to, notifying any other active SEAs of the transition. During processing associated with a "Configure Backup as Primary" block 282, SEA_2 121 makes the transition to primary SEA, including assuming all the duties previously performed by SEA_1 117 and initiating a process to monitor ARP packets (see 240, FIG. 4).

During processing associated with a "Transmit Reverse ARPs to Switches" block 284, the newly functioning primary SEA transmits reverse ARP messages associated with stored MAC addresses to a switch connected to SEA_2 121, which in this example is switch 126 (FIGS. 1 and 2). Since the reverse ARP packet is typically broadcast or multicast the packet is also propagated to other switches in computing system architecture 100 such as switch_1 126 coupled to SEA_1 117. As explained above in conjunction with FIG. 4, MAC addresses were transmitted by SEA_1 117 while function as the primary and stored by SEA_2 121 while functioning as the backup (see 250, FIG. 4). In this manner, active switches are informed of the transition and packet losses are minimized because switches do no continue to transmit to inactive VIOSs and SEAs.

Once a failover has been implemented during processing associated with blocks 280, 282 and 284, control proceeds to an "End Detect Failover" block 289 during which process 270 is complete. In the event that a failover is not needed, process 270 loops through blocks 274, 276 and 278, pinging SEA_1 117.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the formed disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   receiving a first address resolution protocol (ARP) packet at a first shared Ethernet adapter (SEA) coupled to a first switch;
   parsing, by the first SEA, a first MAC address corresponding to the first ARP packet;
   transmitting, in response to receiving the first ARP packet, the first MAC address to a second SEA coupled to a second switch;
   storing the first MAC address at the second SEA;
   detecting that the first SEA has transitioned from a primary configuration to an inactive configuration and that the second SEA has transitioned from a backup configuration to the primary configuration; and
   responsive to the detecting, transmitting a reverse ARP packet to the second switch coupled to the second SEA notifying, the second switch that the first SEA has transitioned to an inactive configuration and that the second SEA has transitioned to an active configuration; and
   configuring the first switch to forward any subsequent packets to the second switch rather than the first SEA.

2. The method of claim 1, further comprising:
   detecting that the first SEA has transitioned from the backup configuration to the primary configuration and that the second SEA has transitioned from the primary configuration to the backup configuration; and
   responsive to the detecting, transmitting a reverse ARP packet to the first switch coupled to the first SEA notifying the first switch that the first SEA has transitioned to the primary configuration; and
   configuring the second switch to forward any subsequent packets to the first switch rather than the second SEA.

3. The method of claim 1, wherein the transmitting the reverse ARP packet is via multicast such that the reverse ARP packet is received by the first SEA.

4. The method of claim 1 wherein the transmitting the reverse ARP packet is via broadcast such that the reverse ARP packet is received by the first SEA.

5. The method of claim 1, further comprising:
   storing the first MAC address and a second MAC address corresponding to a second ARP packet; and
   transmitting the second MAC address in conjunction with the transmitting of the first MAC address.

6. The method of claim 1, wherein the claimed method is executed in conjunction with a hypervisor.

7. The method of claim 6, wherein the first SEA and the second SEA communicate via a control channel associated with the hypervisor.

8. An apparatus, comprising;
   a first shared Ethernet adapter (SEA);
   a first switch coupled to the first SEA;
   a second SEA;
   a second switch coupled to the second SEA;
   a processor;
   a computer-readable storage medium ((CRSM) coupled to the processor; and
   logic, stored on the CRSM and executed on the processor, for:
      receiving a first address resolution protocol (ARP) packet at the first shared Ethernet adapter (SEA);

parsing a first MAC address from the first ARP packet;
transmitting, in response to receiving the first ARP packet, the first MAC address to the second SEA;
storing the first MAC address at the second SEA;
detecting that the first SEA has transitioned from a primary configuration to an inactive configuration and that the second SEA has transitioned from a backup configuration to the primary configuration; and
responsive to the detecting, transmitting a reverse ARP packet to the second switch notifying the second switch that the first SEA has transitioned to an inactive configuration and that the second SEA has transitioned to an active configuration; and
configuring the first switch to forward any subsequent packets to the second switch rather than the first SEA.

9. The apparatus of claim 8, the logic further comprising logic for:
detecting that the first SEA has transitioned from the backup configuration to the primary configuration and that the second SEA has transitioned tram the primary configuration to the backup configuration; and
responsive to the detecting, transmitting a reverse ARP packet to the first switch coupled to the first SEA notifying the first switch that the first SEA has transitioned to the primary configuration; and
configuring the second switch to forward any subsequent packets to the first switch rather than the second SEA.

10. The apparatus of claim 8, wherein the logic for transmitting the reverse ARP packet employs multicast to transmit the reverse ARP packet to the first SEA.

11. The apparatus of claim 8, wherein the logic for transmitting the reverse ARP packet employs broadcast to transmit the reverse ARP packet to the first SEA.

12. The apparatus of claim 8, the logic further comprising logic for:
storing, on the CRSM, the first MAC address and a second MAC address corresponding to a second ARP packet; and
transmitting the second MAC address in conjunction with the transmitting of the first MAC address.

13. The apparatus of claim 8, wherein the first SEA and the second SEA communicate via a hypervisor.

14. The apparatus of claim 8, wherein the first SEA and the second SEA communicate via a control channel associated with the hypervisor.

15. A computer programming product, comprising:
a non-transitory computer-readable storage medium, and
logic, stored on the computer-readable storage medium for execution on a processor, for:
receiving a first address resolution protocol (ARP) packet at a first shared Ethernet adapter (SEA) coupled to a first switch;
parsing, by the first SEA, a first MAC address from the first ARP packet;
transmitting, in response to receiving the first ARP packet, the first MAC address to a second SEA coupled to a second switch;
storing the first MAC address at the second SEA;
detecting that the first SEA has transitioned from a primary configuration to an inactive configuration and that the second SEA has transitioned from a backup configuration to the primary configuration; and
responsive to the detecting, transmitting a reverse ARP packet to the second switch coupled to the second SEA notifying the second switch that the first SEA has transitioned to an inactive configuration and that the second SEA has transitioned to an active configuration; and
configuring the first switch to forward any subsequent packets to the second switch rather than the first SEA.

16. The computer programming product of claim 15, the logic further comprising logic for:
detecting that the first SEA has transitioned from the backup configuration to the primary configuration and that the second SEA has transitioned from the primary configuration to the backup configuration; and
responsive to the detecting, transmitting a reverse ARP packet to the first switch coupled to the first SEA notifying the first switch that the first SEA has transitioned to the primary configuration; and
configuring the second switch to forward any subsequent packets to the first switch rather than the second SEA.

17. The computer programming product of claim 15, wherein the logic for transmitting the reverse ARP packet employs multicast to transmit the reverse ARP packet to the first SEA.

18. The computer programming product of claim 15, wherein the logic for transmitting the reverse ARP packet employs broadcast to transmit the reverse ARP packet to the first SEA.

19. The computer programming product of claim 15, the logic further comprising logic for:
storing the first MAC address and a second MAC address corresponding to a second ARP packet; and
transmitting the second MAC address in conjunction with the transmitting of the first MAC address.

20. The computer programming product of claim 15, wherein the claimed method is executed in conjunction with a hypervisor.

* * * * *